March 29, 1966  G. M. GROVER  3,243,613
PANCAKE REACTOR

Filed Jan. 3, 1964  3 Sheets-Sheet 1

INVENTOR.
George M. Grover
BY
Roland A. Anderson

INVENTOR.
George M. Grover

March 29, 1966  G. M. GROVER  3,243,613
PANCAKE REACTOR

Filed Jan. 3, 1964  3 Sheets-Sheet 3

INVENTOR.
George M. Grover
BY
Roland G. Anderson

United States Patent Office 3,243,613
Patented Mar. 29, 1966

3,243,613
PANCAKE REACTOR
George M. Grover, Los Alamos, N. Mex., assignor to the United States of America as represented by the United States Atomic Energy Commission
Filed Jan. 3, 1964, Ser. No. 336,099
12 Claims. (Cl. 310—4)

The present invention relates to a nuclear reactor and, more particularly, to a reactor for the direct conversion of heat to electricity. The invention described herein was made in the course of, or under, a contract with the U.S. Atomic Energy Commission.

Nuclear reactors heretofore constructed have been relatively large units requiring complex auxiliary equipment for the conversion of the produced heat to electricity. For many applications, e.g., airborne or space reactors, it is very desirable that the reactor and its auxiliary equipment be small, light, and of simple construction.

It is accordingly one of the objects of the present invention to provide a neutronic reactor for producing useful power which is of a relatively low specific mass (ratio of mass to electrical power output).

It is a further object of this invention to provide a nuclear reactor which directly converts the heat provided by fission to electricity.

It is another object of this invention to provide a nuclear reactor wherein all the waste heat is dissipated solely by the heat transfer mechanism of radiation.

It is another object of this invention to provide a nuclear reactor which would be exceedingly useful as a power source in space.

The above and other objects of this invention are accomplished by a reactor comprising a fuel plate (emitter), a collector, said fuel plate and collector (coolant plate) being separated, an easily ionizable gas contained in the space between said fuel plate and collector, said collector comprising a container, said container enclosing a condensable vapor and capillary means within the container capable of causing the transport of the condensed vapor from a cooler area of the container to a hotter area. In the reactor described, the emitters and collectors are of cylindrical shape, each collector and fuel plate comprising a cell. The cells are stacked one on top of the other thereby engendering the name "Pancake Reactor."

For a more complete understanding of the present invention, together with additional advantages, reference is made to the following disclosure, particularly when viewed in light of the drawings in which.

Figure 1:
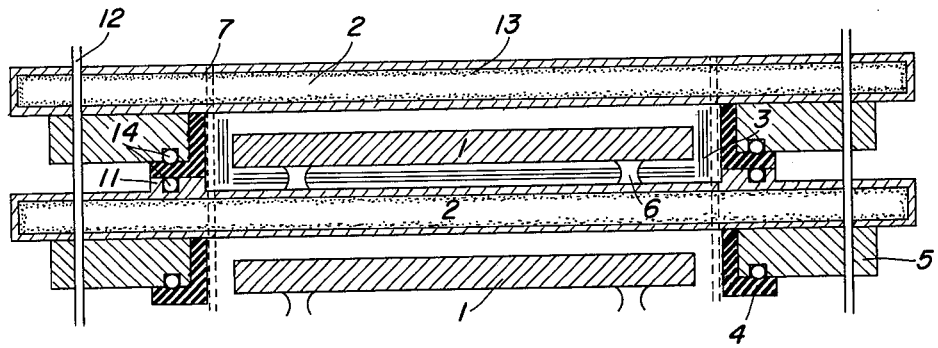
FIGURE 1 is a vertical sectional view of two cells in a reactor incorporating the present invention.

FIGURE 1 shows two pancakes embodying the present inventive concept. While only two pancakes are shown, it should be kept in mind that these pancakes are stacked one on top of the other in numbers sufficient to make a critical configuration. Since only two cells have been illustrated, the end reflector present at both ends of the stack has not been shown. Referring to FIGURE 1, the reactor comprises a number of cells, said cells being stacked in pancake fashion. Each cell comprises a fuel plate or emitter 1, a collector 2, a plurality of radiation shields 3, an insulator ring 4, and a side reflector ring 5. These structures are cylindrical in shape. Tie rods 12 extend through the reactor and serve to hold the pancakes together. It is desirable that these tie rods be constructed so that they operate as heat pipes, that is, the tie rods should enclose a condensable vapor saturating a capillary path. This will aid in dissipating heat deposited in these tie rods. It will be noted that emitter 1 and collector 2 are separated from each other by insulator 4. The space between these structures contains an easily ionized vapor such as the alkali metal cesium. The alkali metal vapors are preferred since they are most easily ionized. In addition, these easily ionized materials have insignificant macroscopic absorption cross sections for neutrons because of the low plasma density. It will be seen from FIGURE 1 that a projection 11 is built up on the upper surface of coolant plate 2. This is done in order that the coolant plate will accommodate a metal O-ring 14. The beryllium reflector 5 holds another O-ring 14 against the insulator ring 4.

The emitter of one cell is supported by and electrically connected to the collector of its subjacent cell by connections 6. Dotted lines 7 signify a conduit for the passage of cesium vapor through the plates. This permits circulation of the cesium vapor from one cell to another and from a reservoir of cesium (not shown).

It will be noted that collector 2 is of a special construction which enables very high heat transfer with a minimum temperature drop from the center of the collector to the edges. Collector 2 is of hollowed construction so that it may be regarded as a container. The inside walls of this container is covered with a wick of suitable capillary structure shown at 13. It is a requirement that the pore size be sufficiently small to produce capillary action and that the material utilized be compatible at the conditions of operation. The collector encloses a condensable gas which saturates the wick in its liquid form.

Figure 2:
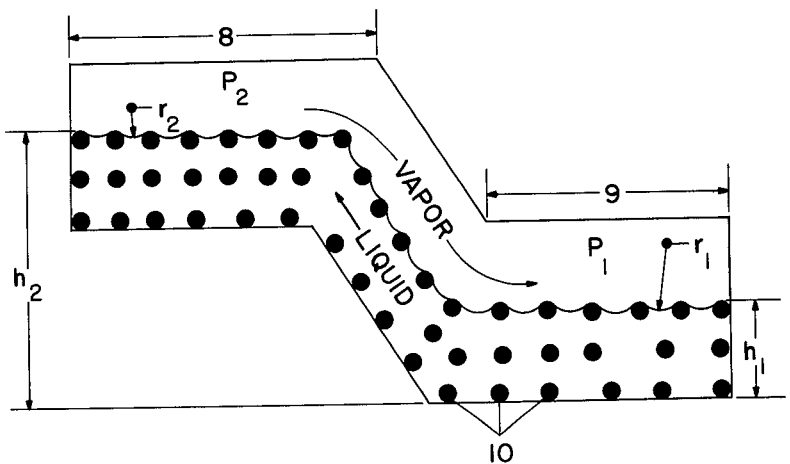
FIGURE 2 is a schematic diagram of the principle of operation of a heat pipe (the collector of the described reactor embodying this principle).

The principle of operation of a heat pipe is shown schematically in FIGURE 2. The wick is saturated with a wetting liquid. In the steady state, the liquid temperature in the evaporator is slightly higher than in the condenser region. The resulting difference in pressure in the vapor, $P_2-P_1>0$, drives the vapor from evaporator region 8 to condenser region 9. The depletion of liquid by evaporation causes the vapor-liquid interface in the evaporator to retreat into the wick surface where the typical meniscus has a radius of curvature, $r_2$, equal to, or greater than, the largest capillary pore radius. The capillary represented in the drawing as a wire mesh is shown at 10. The pressure in the adjacent liquid will then be $P_2-(2\gamma \cos \theta)/r_2$, where $\gamma$ is the surface tension and $\theta$ the contact angle. In the condenser the typical meniscus assumes a radius, $r_1$, which cannot exceed some relatively large radius determined by the geometry of the pipe. The pressure in the condenser liquid is then, $P_1-(2\gamma \cos \theta)/r_1$. The pressure drop available to drive the liquid through the wick from the condenser to the evaporator against the viscous retarding force is $$2\gamma(1/r_2-1/r_1) \cos \theta - (P_2-P_1) - \rho g(h_2-h_1)$$

where $\rho$ is the liquid density, $g$ the acceleration of gravity, and $h_2$ and $h_1$ the heights of the liquid surfaces above a reference level. This pressure drop may be made positive by choosing the capillary pore size sufficiently small. The above equation can be solved for $r_2$ since the term $1/r_1$ is so small as to be negligible. The pore radius of the capillary materials should then be selected to be smaller than $r_2$. Care should be taken to not make the pore radius too much smaller than $r_2$ since for very small pores the increased viscous drag would interfere with the capillary return. It should be particularly noted that the possible case, $g=0$ (existent in gravity-free conditions such as space applications), is not excluded. Heat pipes will work under gravity-free conditions and even, to some extent, in opposition to gravity.

In the reactor described, the condensable vapor utilized is lithium. Of course, the choice of container material and vapor is a matter of some discretion. For example, molten sodium in a stainless steel container, lithium coolant in a niobium-1% zirconium alloy container or molten silver in tantalum may be used. The choice of material is governed to a large extent by the desired collector temperature during operation.

Care must be taken to avoid the presence of inert gases in the collector. If inert gases are present the heat flux in this region will be accomplished by ordinary thermal conduction, mainly by the container wall and the saturated wick. This would result in a rapidly decreasing temperature profile along the heat pipe. A heat pipe has been tested and the thermocouples welded at intervals along the device were not precise enough to detect the minute temperature gradient but the gradient does not exceed 0.05° K./cm. At a power level of 600 watts, calculations indicate that the actual temperature gradient was at least an order of magnitude less than this upper limit. Clearly this very low temperature gradient along the collector permits very efficient radiation from the edge of each collector. It is desirable that the collectors increase in diameter from both ends to the center of the reactor. This is owing to the fact that more power is released in the center portion of the reactor than at the ends. The larger diameter coolant plates will permit more radiation from the center coolant plates.

Since thermionic converters require a substantial temperature differential between the hot emitter and the "cold" collector, it is seen that the remarkable heat transfer rate with very small temperature gradient associated with the "heat pipe" permits the efficient operation of this device.

A number of considerations enter into determining the parameters and configurations of an optimum reactor. A perfect system would minimize total mass, fuel mass, specific mass (ratio of mass to electrical output) and fission ratio (ratio of maximum to minimum fission rates across the reactor core).

Calculations indicate that no two of these characteristics may be minimized simultaneously and it is necessary to select an optimum system which is perfect in no respect. A computed optimum system uses U-233 for fuel in the emitter 1 (60 v./o. $UO_2$ in Mo). There are eight emitters (7.31" O.D. x 0.911" high) and the total fuel mass is 24 kg. The system will produce 6.5 kwe. Total core height is 9.45". The reactor height including the end reflectors (not shown) is 13.81". The reactor diameter (including the side reflector 5) 20.16". The total mass is 172 kg. and the fission rate is 1.24. The specific mass of the reactor is 58 lbs./kwe. The radiator weighs 22 kg. and has a maximum diameter of 31.3". Each pancake has a height of 3 cm. The emitter 1 is a disc of $Mo-UO_2$ clad with tungsten. The height of the emitter disc is 2.3142 cm. The gap between emitter 1 and collector 2 has a width of 0.03". The collector itself is 0.2" thick. The collector is constructed of niobium-1% zirconium alloy and contains lithium coolant. Radiation shields 3 are of tungsten. Four radiation shields, each 0.5 mil thick, are placed below and around the emitter. The total thickness of the radiation shield region below the emitter is 0.04", around the emitter 1 cm. The insulator 4 is $Al_2O_3$ and has a thickness of 0.125". The section which extends under the reflector is 0.25" wide. The reflector 5 is beryllium, 2.1745 cm high. The emitter operates at approximately 1800° C., while the collector operates at about 1000° C. The beryllium side reflector is in physical contact with the coolant plate in order to remove heat from the reflector. Since the coolant plate operates at 1000° C. and beryllium has a rather high rate of evaporation at this temperature, it is desirable to coat or can the beryllium reflector. Tungsten is the preferred material for this coating or canning material.

While no specific means of control are shown in the drawings, the nature of pancake reactors makes any method of control which involves the core impractical. Hence, reflector control of some type is necessary. For example, control may be achieved by movement of the reflector material at the cylindrical ends of the reactor. Poison rods in the cylindrical reflector is another method of achieving control. The use of poison rods in the cylindrical reflector would depend somewhat on the thermalization of the neutrons in a pancake reactor. If poison rods are utilized, it is desirable that these be constructed so that they act as a heat pipe, that is a condensable vapor should saturate a capillary path inside the poison rod. Since the poison rod extends through the reactor, heat will be radiated from heat pipe extensions from the ends thereof. The reactor described is, of course, capable of many modifications, all within the spirit and scope of the present invention.

For example, the calculations indicate that total mass may be reduced (to about 130 kg.) by keeping eight pancakes and increasing the emitter radius or by reducing the number of pancakes to six or seven and increasing the emitter radius even more. In either case, the U-233 mass is increased to about 40 kg. The pancake reactor may be thermalized by the addition of a moderator. This may be accomplished by, for example, addition of beryllium discs between the pancakes.

Figure 3:
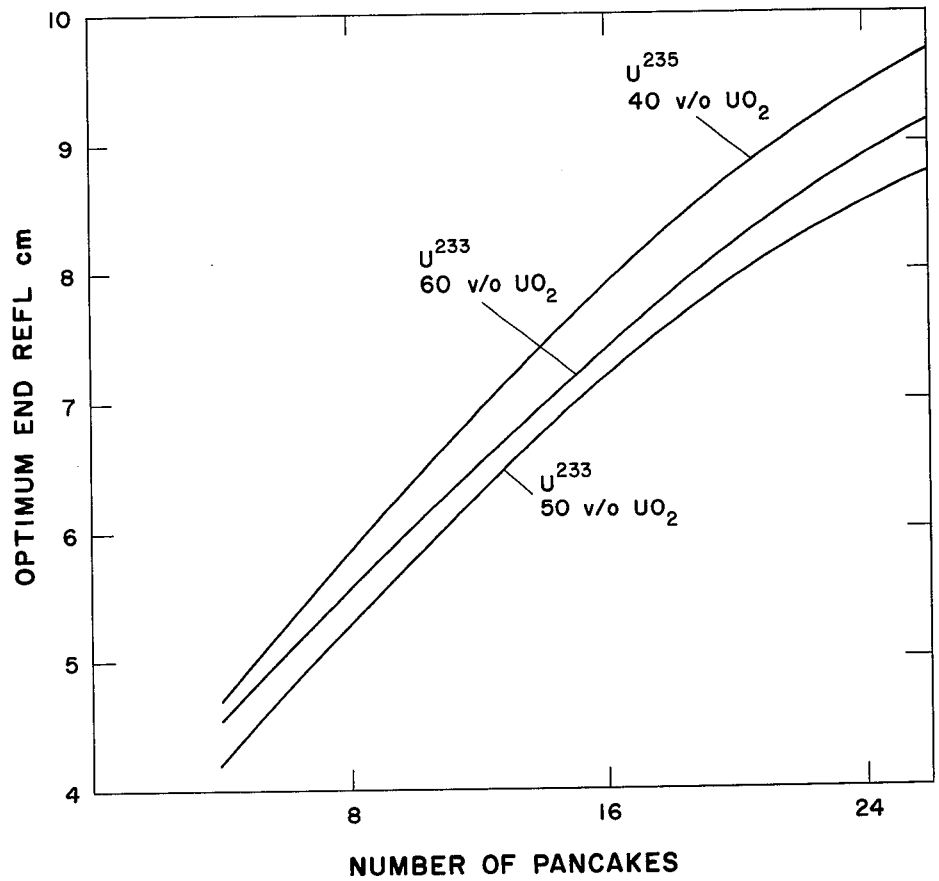
FIGURE 3 is a graph showing the optimum end reflector thickness as a function of the number of pancakes for various fuel compositions.

FIGURE 3 shows that the optimum reflector thickness is a nearly linear function of the number of pancakes in the core. The optimum end reflector is that thickness which produces the flattest axial distribution in the core. The thickness depends on both the core height and the geometry and materials in the core. For a given core, the fission ratio (ratio of maximum to minimum fission density) is extremely sensitive to reflector thickness.

Figure 4:
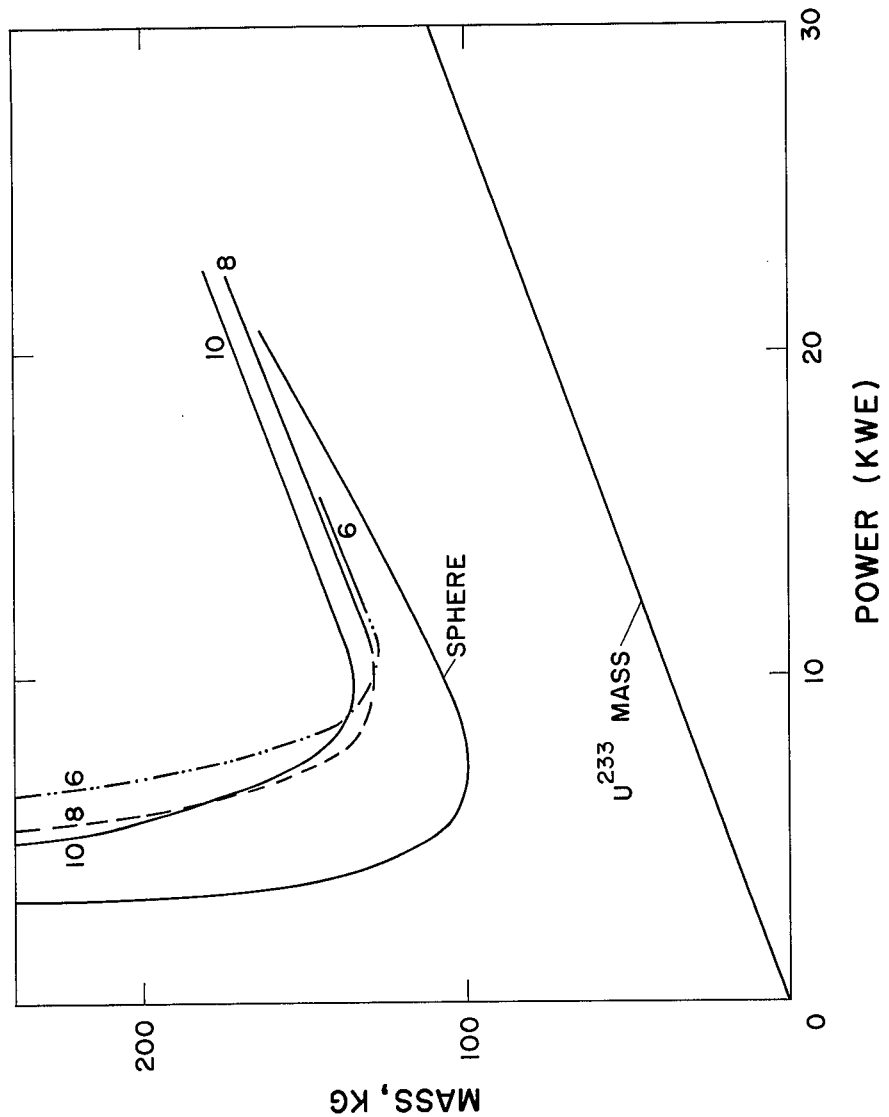
FIGURE 4 is a plot of power versus mass for varying numbers of pancakes.

FIGURE 4 represents total mass as a function of power for varying numbers of pancakes. For a fixed number of pancakes the curve has the following characteristics:

(i) At maximum power, the total mass is the core mass plus the end reflector mass. This is the design with no side reflector.

(ii) As side reflector is added, some of the core may be removed and there is a decrease in total mass and in power.

(iii) When the side reflector reaches a certain thickness, more and more reflector is required to remove a given amount of core material, and the total mass increases, although the power continues to decrease.

From the above description, it can be seen that the described reactor is very advantageous in space applications. All of the auxiliary cooling equipment required by ordinary power reactors has been eleminated thereby making the reactor very small and light compared to other power reactors. Furthermore, the reactor directly converts heat to electricity. The method of cooling is capable of operation under gravity-free conditions.

While a specific reactor embodying the inventive concept has been described above, it is not intended that the scope of the present invention be limited by the foregoing disclosure, but rather by the appended claims.

What is claimed is:

1. A fuel cell for a nuclear reactor comprising an emitter containing nuclear fuel, a collector, said collector and emitter containing nuclear fuel being separated, an easily ionizable gas contained in the space between said emitter containing nuclear fuel and collector, said collector comprising a container, said container enclosing a condensable vapor and capillary means within the container capable of causing the transport of condensed vapor from a cooler area of the container to a hotter area.

2. A nuclear reactor as in claim 1 wherein the easily ionizable gas is an alkali metal.

3. A nuclear reactor as in claim 1 wherein the easily ionizable gas is cesium.

4. A nuclear reactor as in claim 1 wherein the emitter comprises U-233.

5. A nuclear reactor as in claim 4 wherein the U-233 is in the form of 60 v./o. $UO_2$ in Mo.

6. A nuclear reactor as in claim 5 wherein the emitter is clad with tungsten.

7. A nuclear reactor comprising a plurality of cells, each said cell comprising an emitter containing a nuclear fuel, a collector, said emitter containing a nuclear fuel and collector being separated and both of cylindrical configuration, an easily ionized gas contained in the space between said emitter and collector, said collector comprising a container, said container enclosing a condensable vapor and capillary means within the container capable of causing the transport of condensed vapor from a cooler area of the container to a hotter area.

8. A nuclear reactor as in claim 7 wherein the collector cylinder is of a larger diameter than the emitter cylinder.

9. A nuclear reactor as in claim 8 wherein a reflector ring surrounds said emitter cylinder, said reflector ring being in physical contact with the coolant plate.

10. A nuclear reactor as in claim 7 wherein the condensable vapor in the collector is lithium.

11. A nuclear reactor as in claim 7 wherein the easily ionizable gas is cesium.

12. A nuclear reactor as in claim 7 wherein the emitter is separated from the collector by an insulator ring.

References Cited by the Examiner

UNITED STATES PATENTS

| | | | |
|---|---|---|---|
| 3,002,116 | 9/1961 | Fisher | 310—4 |
| 3,079,515 | 2/1963 | Saldi | 310—4 |
| 3,137,798 | 6/1964 | Noyes et al. | 310—4 |
| 3,144,596 | 8/1964 | Coles | 310—4 |

REUBEN EPSTEIN, *Primary Examiner.*